United States Patent Office 3,493,445
Patented Feb. 3, 1970

3,493,445
AMMONIUM NITRATE COMPOSITION CONTAINING ZINC OXIDE AND AN OCTADECYLAMINE AND/OR ITS ACETATE
Kinzo Takata and Hisatoshi Sakamoto, Niihama-shi, Japan, assignors to Sumitomo Chemical Co., Ltd., Osaka, Japan
No Drawing. Filed Feb. 12, 1969, Ser. No. 798,808
Claims priority, application Japan, Feb. 19, 1968, 43/10,729
Int. Cl. C06b 1/04
U.S. Cl. 149—46    15 Claims

ABSTRACT OF THE DISCLOSURE

Compositions containing ammonium nitrate, active zinc white and octadecylamine and/or its acetate, advantageously employed in the production of explosives.

Process for forming the same by mixing ammonium nitrate with active zinc white and octadecylamine and/or its acetate as an agent, the agent prepared by treating an active zinc white-octadecylamine and/or its acetate mixture at a temperature between the melting point and the decomposition temperature of octadecylamine or its acetate. Other process embodiments are described.

BACKGROUND OF THE INVENTION

Field of the invention

This invention relates to compositions containing ammonium nitrate, active zinc white and octadecylamine and/or its acetate, which may be advantageously employed for the production of explosives, and also relates to a process for producing the same. This invention also provides for the reduction of caking of ammonium nitrate.

Description of the prior art

The caking tendency of ammonium nitrate due to the hygroscopicity thereof and variations in the temperature or the variation of the crystal volume according to the transition of the crystal phase, causes a large problem with this material on handling. Up to the present, many processes have been suggested to prevent the caking of ammonium nitrate, such as the addition of drying agents, the addition of inorganic powders such as bentonite, active alumina or aluminum sulfate, coating with organic water-proofing agents, treating with crystalline modification agents, the addition of surface active agents, and the addition of the sulfates of iron, aluminum, or zinc, or the double salts thereof.

However, ammonium nitrate prepared by the above processes has only been employed as a material for explosives with defects, such as deterioration of thermostability and with an increase in the bulk hygroscopicity thereof.

Particularly when the above-processed ammonium nitrate is used in producing ammonium nitrate-fuel oil explosives (the so-called AN-FO explosives), it may be difficult to produce explosives having a uniform explosibility. Accordingly, it has been strongly desired to provide an agent to prevent the caking of ammonium nitrate which will as well improve the detonation velocity of explosives produced therefrom.

For ammonium nitrate which is employed as the main component for producing explosives, it is required that it be useful to easily produce the explosives, and that the explosives obtained therefrom exhibit stable explosibility, as well as uniformity of quality.

Summary of the invention

The invention initially comprises a novel composition containing ammonium nitrate, active zinc white and octadecylamine and/or its acetate. The composition is most advantageously utilized in forming explosives.

The invention further comprises a process for producing the above composition, the process comprising mixing ammonium nitrate with an agent, the agent comprising active zinc white and octadecylamine and/or its acetate. The agent is prepared by treating a mixture of active zinc white and octadecylamine and/or its acetate at a temperature between the melting point and the decomposition temperature of the octadecylamine and/or its acetate. Alternatively, the ammonium nitrate may be mixed with active zinc white and octadecylamine and/or its acetate at a temperature between the melting point and the decomposition temperature of the octadecylamine or its acetate.

The active zinc white and octadecylamine and/or its acetate is most preferably present in an amount of between about 0.1 to about 1.5% by weight, based on ammonium nitrate.

The ratio of active zinc white to octadecylamine and/or its acetate is preferably within the range 50:50–98:2.

The invention also comprises a process for preventing the caking of ammonium nitrate, the process comprising mixing ammonium nitrate with an agent consisting of active zinc white and octadecylamine and/or its acetate, the agent being prepared by treating a mixture of active zinc white and octadecylamine and/or its acetate at a temperature between the melting point and the decomposition temperature of octadecylamine and/or its acetate. Alternatively, the ammonium nitrate may be mixed with active zinc white and octadecylamine and/or its acetate at a temperature between the melting point and the decomposition temperature of octadecylamine or its acetate.

The invention further comprises an explosive material which comprises ammonium nitrate, active zinc white and octadecylamine and/or its acetate, the above materials forming the active ingredients of the explosive.

Thus, one object of the present invention is to provide compositions containing ammonium nitrate which may be advantageously employed for the production of explosives.

Another object of the invention is to provide a process for producing the above compositions.

Yet another object of the invention is to provide a process for preventing the caking of ammonium nitrate.

Still further objects of the invention will be apparent from the following detailed description.

DESCRIPTION OF THE PREFERRED EMBODIMENTS

These and other objects can be accomplished by the provision of compositions containing ammonium nitrate, active zinc white and octadecylamine and/or the acetate thereof. A process for producing the same which comprises mixing ammonium nitrate with an agent consisting of active zinc white and octadecylamine and/or its acetate, or mixing ammonium nitrate with active zinc white and octadecylamine and/or its acetate, is also provided.

The present inventors have investigated various agents from the viewpoint of improving the initiation sensitivity and the detonation velocity of the produced explosives, as well as the preventing caking of ammonium nitrate itself, and have found that an agent consisting of active zinc white and octadecylamine and/or its acetate meets all of the above objects.

The composition for explosives according to this invention consist of 0.1 to 1.5% by weight of the treating agents based on ammonium nitrite, and may be obtained by adding the agent consisting of active zinc white and octadecylamine and/or its acetate to ammonium nitrate at a temperature range between the melting point and the decomposition temperature of octadecylamine or its acetate. The amount of the agent being 0.1 to 1.5% by weight based on ammonium nitrate, with the mixing ratio of active zinc white to octadecylamine and/or its acetate being within a range of between 50:50 and 98:2, the ammonium nitrate employed being preferably in the form of a powder, a crystal or in the prill form.

On the other hand, the composition may be also obtained by mixing ammonium nitrate, active zinc white and octadecylamine and/or its acetate (in order) in the amount ratio described above.

Active zinc white employed in the invention may be of ultrafine granular form, having a mean-grain size of not more than $0.2\mu$, and a specific surface area of 4.5 to 5.5 $m.^2/g.$, the shape of said grain being substantially spherical the active zinc white, which is also called active zinc oxide, consists essentially of zinc oxide with slight amounts of zinc carbonate and zinc hydroxide.

In the present invention, the agents mentioned below are most preferably employed.

(1) A powdered agent prepared by adding water to active zinc white and octadecylamine and/or its acetate, agitating and mixing the mixture sufficiently, and thereafter rapidly drying at a temperature of 50 to 250° C.

(2) An agent prepared by charging active zinc white and octadecylamine and/or its acetate into a stirring drum that is kept in the temperature range of between the melting point and the decomposition temperature of octadecylamine or its acetate, namely at a temperature between 50° to 250° C., the mixture being subjected to agitating and mixing sufficiently therein.

The mixing ratio of active zinc white and octadecylamine and/or its acetate may be changeable between 50:50 and 98:2 according to the objects of usage of the agent, the ratio of 80 to 97:20 to 3 being most preferably employed.

For the various mixing ratios, for example, the caking degree of the compositions, and the initiation sensitivity and detonation velocity of the explosives containing the compositions are shown in the following table.

The compositions and explosives were prepared as follows.

The mixtures of active zinc white and acetate of octadecylamine in the amount of the various ratio thereof were dried at a temperature of 100° to 130° C., to thereby obtain powdered agents containing 2.0% by weight amount moisture.

The resulting agents were respectively added to porous prilled ammonium nitrate in an amount of 0.5% by weight based on the ammonium nitrate.

The compositions obtained were mixed with 6% by weight of fuel oil, to thereby obtain the explosives, namely AN-FO explosives.

TABLE 1

| Composition ratio (by weight percent) | | Initiation sensitivity of explosive (number of detonator) | Detonation velocity (m./sec.) | Caking degree (by weight percent) |
|---|---|---|---|---|
| Active zinc white | Acetate of octadecylamine | | | |
| 0 | 0 | 7 | 2,780 | 97 |
| 100 | 0 | 6 | 2,900 | 43 |
| 99 | 1 | 5 | 2,910 | 11 |
| 97 | 3 | 3 | 2,960 | 10 |
| 95 | 5 | 3 | 3,010 | 4 |
| 90 | 10 | 2 | 3,010 | 3 |
| 85 | 15 | 2 | 3,050 | 3 |
| 80 | 20 | 2 | 3,100 | 4 |
| 70 | 30 | 1 | 3,220 | 4 |
| 60 | 40 | 1 | 3,300 | 1 |
| 50 | 50 | 1 | 3,380 | 0 |

It is clear from the results in Table 1 that the initiation sensitivity and detonation velocity of the explosives are increased at higher mixing ratios of the acetate of octadecylamine. When the ratio of the acetate exceeds 50%, it becomes oversensitive.

The caking degree, the sensitivity, and the detonation velocity of the explosives described in this experiment were measured in the following manner:

THE CAKING DEGREE (1) The "small bag" packing test

After heat-sealing the mouth of a bag of polyethylene 0.2 mm. in thickness into which 1 or 2 kgs. of the sample had been packed, the bag was stored for 20 days under a load of 0.5 kg./cm.$^2$ g. and in alternating conditions of temperatures between 20° and 45° C. and relative humidities between 40% and 80% (one time a day). The bag was dropped from a height of 80 cm., and thereafter degree of "caked" material not passed through a screen of 6 mesh was determined.

The results are shown in the weight percent column which represents a mean value of three test runs.

(2) The "bag" piling test

After filling a humidity proof paper bag with 30 kg. of sample and sealing the mouth thereof, the bag was stored for 30 days with a load (corresponding to the ten layer of said bag) under the same conditions as that of the small bag packing test mentioned above. The bag was then dropped from a height of 1 m. two times, and after that the degree of the "caked" material that was not passed through a screen 6 Taylor mesh was determined, the mean value of the results of three tests being shown in the table.

Initiation sensitivity test for the AN-FO explosives: The explosives in a freely fluidable state were filled into a carton paper tube whose size was 100 mm. (open diameter) by 100 mm. (height). This was placed on an iron block whose size was 450 mm. x 270 mm. x 130 mm. A No. 6 detonator was buried in the center of said explosives. The detonating fuse (for determination purposes) was arranged in between said iron block and said carton paper tube with an aperture of about 15 mm. from the center of said carton paper tube, forming a chord to said paper tube. Explosion was determined to be completed when complete ignition and burning of said detonating fuse was observed. When there remained even a small part of said detonating fuse unburned, this was called a "missed round."

Until complete explosion was observed, the number of No. 6 detonators was increased. The results for this testing are shown by the number of said detonators needed for complete explosion.

Detonation velocity of the AN-FO explosives: The detonation velocity was determined by the Dautriche method. 70 g. of dynamite was used as the booster and a No. 6 detonator was used as the primer. The density of the charge is expressed by the mean value of the results obtained for repeating testing two times under 0.85 to 0.90 g./cc.

When the amount of the agent consisting of active zinc white and octadecylamine and/or its acetate to said ammonium nitrate is in the range of 0.1 to 1.5 weight percent (based on the dry weight of said ammonium nitrate) preferable results are obtained. For various amounts of agent, the results are shown in the table following (Table 2). The experiment was executed in a manner similar to that for the experiment involving the mixing ratio of active zinc white and the acetate of octadecylamine.

TABLE 2

| Mixing ratio (by weight percent) | | Amount of the agent (by weight percent) | Initiation Sensitivity of explosive (number of detonators) | Detonation velocity (m./sec.) | Caking degree (by weight percent) |
|---|---|---|---|---|---|
| Active zinc white | Octadecylamine acetate | | | | |
| 95 | 5 | 0.05 | 7 | 2,800 | 60 |
| 95 | 5 | 0.10 | 6 | 2,890 | 32 |
| 95 | 5 | 0.30 | 5 | 2,940 | 11 |
| 95 | 5 | 0.50 | 3 | 2,010 | 3 |
| 95 | 5 | 0.80 | 2 | 3,160 | 1 |
| 95 | 5 | 1.00 | 1 | 3,200 | 0 |
| 95 | 5 | 1.50 | 1 | 3,250 | 0 |
| 95 | 5 | 1.70 | 1 | 3,310 | 0 |
| 95 | 5 | 2.00 | 1 | 3,380 | 0 |
| 90 | 10 | 0.05 | 7 | 2,800 | 55 |
| 90 | 10 | 0.10 | 6 | 2,890 | 30 |
| 90 | 10 | 0.30 | 4 | 2,950 | 10 |
| 90 | 10 | 0.50 | 2 | 3,010 | 3 |
| 90 | 10 | 0.80 | 1 | 3,190 | 1 |
| 90 | 10 | 1.00 | 1 | 3,290 | 0 |
| 90 | 10 | 1.50 | 1 | 3,330 | 0 |
| 90 | 10 | 1.70 | 1 | 3,370 | 0 |
| 90 | 10 | 2.00 | 1 | 3,410 | 0 |

It is clear that when the amount of the agent consisting of active zinc white and the acetate of octadecylamine is less than 0.1% by weight, the effectiveness in the improvements in the sensitivity of the explosives, the detonation velocity and the caking degree thereof is low. When the amount thereof is more than 1.5% by weight, it is disadvantageous from an economical point of view.

In carrying out the present invention, the agent previously prepared according to the method mentioned above may be added to ammonium nitrate, or active zinc white and octadecylamine and/or its acetate or a mixture thereof may be added to ammonium nitrate which is kept at a temperature of between the melting point and decomposition temperature of octadecylamine or its acetate.

Further, active zinc white and melted octadecylamine and/or its acetate or the mixture thereof may be added to ammonium nitrate. The thus obtained composition is remarkably improved with respect to caking degree. The explosives manufactured by using the composition as the main component thereof are improved in their initiation sensitivity and their detonation velocity. Especially, it is recognized that when the agent is mixed with porous prilled ammonium nitrate, the caking thereof is greatly prevented, and explosives manufactured by mixing the resulting composition with fuel oil are improved in their detonation velocity.

The present invention will now be further explained in detail with reference to the following examples which are given by way of illustration only, and not by way of limitation. Percent and parts are by weight, and the caking degree, initiation sensitivity and detonation velocity are measured according to the methods heretofore described.

Example 1

A mixture of 97 parts of active zinc white (product of Seido Chemical Co., Ltd. in Japan), 3 parts of acetate of octadecylamine, and a small amount of water was stirred to insure mixing, and thereafter the resulting slurry was dried at a temperature of 100° to 130° C., to obtain a powdered agent (moisture content: 2.0%). 0.5 part of the agent obtained was mixed with 99.5 parts of porous prilled ammonium nitrate (moisture content: 0.15%), thereby to obtain a composition having caking degree of 10%.

An explosive prepared by mixing 6 parts of fuel oil with 94 parts of the composition obtained above had an initiation sensitivity of 3, and a detonation velocity of 2960 m./sec.

Examples 2 to 8

Following the exact procedure of Example 1, with the exception of varying the mixing ratio of the active zinc white and the acetate of octadecylamine, the variation being shown in the following table, compositions having the caking degree shown in the table, and explosives having an initiation sensitivity and a detonation velocity shown in the same table, were obtained (see Table 3).

TABLE 3

| Example No. | Composition ratio (by weight percent) | | Initiation sensitivity of explosive (number of detonators) | Detonation velocity (m./sec.) | Caking degree (by weight percent) |
|---|---|---|---|---|---|
| | Active zinc white | Acetate of octadecylamine | | | |
| 2 | 95 | 5 | 3 | 3,010 | 4 |
| 3 | 90 | 10 | 2 | 3,010 | 3 |
| 4 | 85 | 15 | 2 | 3,050 | 3 |
| 5 | 80 | 20 | 2 | 3,100 | 4 |
| 6 | 70 | 30 | 1 | 3,220 | 4 |
| 7 | 60 | 40 | 1 | 3,300 | 1 |
| 8 | 50 | 50 | 1 | 3,380 | 0 |

Example 9

A mixture of 95 parts of active zinc white (product of Seido Chemical Co., Ltd. in Japan), 5 parts of the acetate of octadecylamine and a small amount of water was stirred to insure adequate mixing and thereafter the resulting slurry was dried at a temperature of 100° to 130° C. to thereby obtain a powdered agent (moisture content: 2.0%). 0.1 part of the agent obtained was mixed with 99.9 parts of porous prilled ammonium nitrate (moisture content: 0.15%) to thereby obtain a composition having a caking degree of 32%.

An explosive prepared by mixing 6 parts of fuel oil with 94 parts of the composition obtained above had an initiation sensitivity of 6 and a detonation velocity of 2890 m./sec.

Examples 10 to 16

Following the procedure of Example 9, with the exception of varying the mixing amount of the agent, the exact details being shown in the following table, compositions having a caking degree as shown in the table and explosives having an initation sensitivity and a detonation velocity shown in the same table, were obtained (see Table 4).

TABLE 4

| Ex. No. | Mixing ratio (by weight percent) | | Amount of the agent (by weight percent) | Initiation sensitivity of explosive (number of detonators) | Detonation velocity (m./sec.) | Caking degree (by weight percent) |
|---|---|---|---|---|---|---|
| | Active zinc white | Octadecylamine acetate | | | | |
| 10 | 95 | 5 | 0.30 | 5 | 2,940 | 11 |
| 11 | 95 | 5 | 0.50 | 3 | 3,010 | 3 |
| 12 | 95 | 5 | 0.80 | 2 | 3,160 | 1 |
| 13 | 95 | 5 | 1.00 | 1 | 3,200 | 0 |
| 14 | 95 | 5 | 1.50 | 1 | 3,250 | 0 |
| 15 | 95 | 5 | 1.70 | 1 | 3,310 | 0 |
| 16 | 95 | 5 | 2.00 | 1 | 3,380 | 0 |

Example 17

A mixture of 90 parts of active zinc white (product of Seido Chemical Co., Ltd. in Japan) and 10 parts of the acetate of octadecylamine was treated as in Example 9, to thereby obtain a composition having a caking degree of 30%. An explosive prepared by mixing 6 parts of fuel oil with 94 parts of the composition obtained above had an initiation sensitivity of 6, and a detonation velocity of 2890 m./sec.

Examples 18 to 25

Following the procedure of Example 17, with the exception of varying the mixing amount of the agent, the exact variation being shown in the following table, compositions having a caking degree shown in the table, and explosives having an initiation sensitivity and a detonaton velocity shown in the same table were obtained (see Table 5).

TABLE 5

| Ex. No. | Mixing ratio (by weight percent) | | Amount of the agent (by weight percent) | Initiation sensitivity of explosive (number of detonators) | Detonation velocity (m./sec.) | Caking degree (by weight percent) |
| --- | --- | --- | --- | --- | --- | --- |
| | Active zinc white | Octadecylamine acetate | | | | |
| 18 | 90 | 10 | 0.10 | 6 | 2,800 | 30 |
| 19 | 90 | 10 | 0.30 | 4 | 2,950 | 10 |
| 20 | 90 | 10 | 0.50 | 2 | 3,010 | 3 |
| 21 | 90 | 10 | 0.80 | 1 | 3,190 | 1 |
| 22 | 90 | 10 | 1.00 | 1 | 3,290 | 0 |
| 23 | 90 | 10 | 1.50 | 1 | 3,330 | 0 |
| 24 | 90 | 10 | 1.70 | 1 | 3,370 | 0 |
| 25 | 90 | 10 | 2.00 | 1 | 3,410 | 0 |

Examples 26 and 27 and comparative Examples 1 to 4

A. 95 parts each of active zinc white (product of Seido Chemical Co., Ltd. in Japan), diatomaceous earth and active alumina were mixed with 5 parts of the acetate of octadecylamine, and the mixtures thus formed were dried at a temperature of 100° to 130° C. to thereby obtain agents (moisture content: 1.5%). 0.5 part of the agents obtained were mixed with 95 parts of porous prilled ammonium nitrate to thereby obtain the compositions. Three separate agent-ammonium nitrate mixtures were thus formed.

B. 0.5 part of a mixture of 5 parts of octadecylamine and 95 parts of active zinc white (product of Seido Chemical Co., Ltd. in Japan), diatomaceous earth and active alumina were added to 99.5 parts of porous prilled ammonium nitrate (kept at temperature of 60° C.) to thereby obtain various compositions comprising each of the above "agents" and ammonium nitrate.

The caking degree of the compositions obtained in the above items A and B, and the initiation sensitivity and the detonation velocity of explosives prepared by mixing 6 parts of fuel oil and 94 parts of the compositions are shown in the following Table 6.

TABLE 6

| Example No. | Method of preparing | Kind of agent | Initiation sensitivity (number of detonator of No. 6) | Detonation velocity (m./sec.) | Caking degree (percent) |
| --- | --- | --- | --- | --- | --- |
| 26 | A | Active zinc white, octadecylamine acetate. | 3 | 3,130 | 5 |
| Comparative Ex. 1 | A | Diatomaceous earth, octadecylamine acetate. | 7 | 2,640 | 44 |
| Comparative Ex. 2 | A | Active alumina, octadecylamine acetate. | 9 | 2,750 | 39 |
| Comparative Ex. 3 | B | Diatomaceous earth, octadecylamine. | 7 | 2,600 | 41 |
| Comparative Ex. 4 | B | Active alumina, octadecylamine. | 9 | 2,730 | 40 |
| 27 | B | Active zinc white, octadecylamine. | 3 | 3,130 | 2 |
| Control | | | 9 | 2,760 | 100 |

To further amplify upon the present invention, the zinc white particle size utilized in all examples was 0.2 micron. Generally, it is most preferred, when forming an AN-FO explosive to use 5.5–6.0 parts by weight of the fuel oil.

Finally, in Example 9, 95 parts of water were added.

What is claimed is:

1. A composition comprising ammonium nitrate, a material consisting essentially of active zinc oxide white and a member selected from the group consisting of octadecylamine, the acetate thereof, and mixtures of said octadecylamine and said acetate.

2. A composition according to claim 1 wherein the amount of active zinc oxide and said member from said group is from about 0.1 to about 1.5% by weight, based on the weight of ammonium nitrate.

3. A composition according to claim 1 wherein the ratio of active zinc oxide to the member from said group is within the range of from about 50:50 to about 98:2.

4. A composition according to claim 1 wherein said ammonium nitrate is in the form of a powder, crystal or prill.

5. A process for producing a composition comprising ammonium nitrate, active zinc white and a member selected from the group consisting of octadecylamine, the acetate thereof and the mixtures of said octadecylamine and said acetate, which comprises mixing said materials, said zinc white and said member from said group reaching a temperature between the melting point and the decomposition temperature of said member from said group prior to or during addition of said ammonium nitrate.

6. A process according to claim 5 wherein said active zinc white and said member from said group are separately prepared by heating a mixture of active zinc white and the member from said group at a temperature between the melting point and the decomposition temperature of the member from said group.

7. A process according to claim 5 wherein said ammonium nitrate, said active zinc white, and said member from said group are mixed at a temperature between the melting point and the decomposition temperature of the member from said group.

8. A process according to claim 5 wherein the amount of the active zinc white and the member from said group is from about 0.1 to about 1.5% by weight, based on the weight of ammonium nitrate.

9. A process according to claim 5 wherein the ratio of active zinc white to the member from said group is within the range of between about 50:50 and about 98:2.

10. A process according to claim 5 wherein said ammonium nitrate is in the form of a powder, crystal or prill.

11. A process as in claim 5 wherein said active zinc white and said member from said group are prepared by heating a mixture of these components at a temperature between the melting point and the decomposition temperature of the member from said group, said heating being conducted in the presence of a solvent.

12. A process for preventing the caking of ammonium nitrate which comprises mixing ammonium nitrate, active zinc white and a member selected from the group consisting of octadecylamine, the acetate thereof, and the mixtures thereof, said active zinc white and said member from said group reaching a temperature between the melting point and the decomposition temperature of the member from said group prior to or during addition of said ammonium nitrate.

13. A process according to claim 12 wherein said active zinc white and said member from said group are blended prior to mixing with said ammonium nitrate, said prior blending occurring at a temperature between the melting point and the decomposition temperature of said member from said group.

14. A process according to claim 12 wherein said ammonium nitrate, said active zinc white and said member from said group are mixed at a temperature between the melting point and the decomposition temperature of the member from said group.

15. An explosive composition comprises ammonium nitrate, active zinc white, and a member selected from the group consisting of octadecylamine, the acetate thereof and the mixtures thereof as the active ingredients and a fuel oil.

References Cited

UNITED STATES PATENTS

| | | | |
|---|---|---|---|
| 989,948 | 4/1911 | Cornaro | 149—7 X |
| 1,473,257 | 11/1923 | Snelling | 149—7 X |
| 2,978,377 | 4/1961 | Hall et al. | 149—7 X |
| 3,116,185 | 12/1963 | Wilson et al. | 149—46 X |

CARL D. QUARFORTH, Primary Examiner

S. J. LECHERT, Jr., Assistant Examiner

U.S. Cl. X.R.

149—7, 8; 23—103